(12) United States Patent
Thimbleby et al.

(10) Patent No.: US 10,895,954 B2
(45) Date of Patent: Jan. 19, 2021

(54) PROVIDING A GRAPHICAL CANVAS FOR HANDWRITTEN INPUT

(71) Applicant: Apple Inc., Cupertino, CA (US)

(72) Inventors: William J. Thimbleby, Sunnyvale, CA (US); Peter L. Hajas, San Jose, CA (US); Jennifer P. Chen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 15/721,708

(22) Filed: Sep. 29, 2017

(65) Prior Publication Data

US 2018/0348990 A1 Dec. 6, 2018

Related U.S. Application Data

(60) Provisional application No. 62/514,773, filed on Jun. 2, 2017.

(51) Int. Cl.
| | | |
|---|---|---|
| *G06F 3/0481* | (2013.01) | |
| *G06F 3/0488* | (2013.01) | |
| *G06F 3/041* | (2006.01) | |
| *G06F 3/0354* | (2013.01) | |
| *G06F 3/0484* | (2013.01) | |

(52) U.S. Cl.
CPC ...... *G06F 3/04817* (2013.01); *G06F 3/03545* (2013.01); *G06F 3/0412* (2013.01); *G06F 3/0416* (2013.01); *G06F 3/04842* (2013.01); *G06F 3/04845* (2013.01); *G06F 3/04883* (2013.01); *G06F 2203/04803* (2013.01); *G06F 2203/04806* (2013.01); *G06F 2203/04808* (2013.01)

(58) Field of Classification Search
CPC ............. G06F 3/04817; G06F 3/03545; G06F 3/0412; G06F 3/0416; G06F 3/04842; G06F 3/04883
See application file for complete search history.

(56) References Cited

U.S. PATENT DOCUMENTS 4,259,905 A * 4/1981 Abiko ................ G03G 13/286
101/465
5,680,563 A * 10/1997 Edelman ................ G06F 9/451
715/835

(Continued)

*Primary Examiner* — Jung-Mu T Chuang
(74) *Attorney, Agent, or Firm* — Morgan, Lewis & Bockius LLP (57) ABSTRACT

The subject technology provides rendering an image in a first view including a plurality of tiles, each tile comprising image data corresponding to a portion of the image. The subject technology, responsive to detecting an initiation of touch input corresponding to the image, copies the image data from the plurality of tiles to a graphical canvas. The subject technology displays the image data in the graphical canvas in a second view, the graphical canvas being overlaid over at least a portion of the rendered image. The subject technology receives input stroke data corresponding to the second view, the input stroke data being continuous with the touch input. The subject technology responsive to detecting that the touch input has ended, copies the input stroke data to the plurality of tiles of the first view. Further, The subject technology displays the input stroke data and the image in the plurality of tiles of the first view.

21 Claims, 10 Drawing Sheets

(56) References Cited

U.S. PATENT DOCUMENTS

| | | | | |
|---|---|---|---|---|
| 6,903,751 B2* | 6/2005 | Saund | G06T 11/60 | 345/619 |
| 7,262,785 B2* | 8/2007 | Silverman | G06F 3/04883 | 715/764 |
| 7,373,590 B2* | 5/2008 | Woolf | G06F 17/242 | 715/230 |
| 7,698,660 B2* | 4/2010 | Sanchez | G06F 9/543 | 715/863 |
| 7,907,141 B2* | 3/2011 | Saund | G06K 9/00416 | 345/440 |
| 8,014,607 B2* | 9/2011 | Saund | G06F 3/04883 | 382/187 |
| 8,059,890 B2* | 11/2011 | Bach | G06K 9/4628 | 382/155 |
| 8,261,213 B2* | 9/2012 | Hinckley | G06F 3/03545 | 715/769 |
| 8,416,197 B2* | 4/2013 | Feng | G09G 3/344 | 345/173 |
| 8,438,489 B2* | 5/2013 | Barthelmess | G06F 40/171 | 715/751 |
| 8,555,192 B2* | 10/2013 | Cao | G06F 16/532 | 715/780 |
| 8,907,915 B2* | 12/2014 | Li | G06F 3/04883 | 345/173 |
| 8,977,558 B2* | 3/2015 | Nielsen | G06Q 10/103 | 705/7.42 |
| 9,026,900 B1* | 5/2015 | Pugh | G06F 17/24 | 715/227 |
| 9,170,731 B2* | 10/2015 | Iwema | G06F 3/04883 | |
| 9,275,491 B2* | 3/2016 | Bolz | G06T 15/005 | |
| 9,310,998 B2* | 4/2016 | Demiya | G06F 3/04883 | |
| 9,377,950 B2* | 6/2016 | Rosenfeld | G06F 3/04883 | |
| 9,436,665 B2* | 9/2016 | Pircher | G06F 17/241 | |
| 9,454,694 B2* | 9/2016 | Novak | G06T 11/60 | |
| 9,600,460 B2* | 3/2017 | Gilead | G06F 17/241 | |
| 9,778,830 B1* | 10/2017 | Dubin | A63F 13/65 | |
| 10,064,021 B1* | 8/2018 | Aloni | H04L 65/4061 | |
| 10,129,188 B2* | 11/2018 | Liu | G06F 3/04842 | |
| 10,169,917 B2* | 1/2019 | Chen | G06T 19/006 | |
| 2002/0057275 A1* | 5/2002 | Parikh | G06T 17/00 | 345/522 |
| 2003/0052887 A1* | 3/2003 | Parikh | G06T 15/005 | 345/522 |
| 2004/0060049 A1* | 3/2004 | Mendoza | G06F 9/485 | 718/100 |
| 2004/0135784 A1* | 7/2004 | Cohen | G06T 1/60 | 345/501 |
| 2004/0217947 A1* | 11/2004 | Fitzmaurice | G06T 11/60 | 345/183 |
| 2004/0237033 A1* | 11/2004 | Woolf | G06F 17/242 | 715/211 |
| 2005/0041834 A1* | 2/2005 | Wakeam | G06K 9/222 | 382/100 |
| 2005/0044106 A1* | 2/2005 | Duncan | G06F 40/103 | |
| 2005/0044295 A1* | 2/2005 | Wakeam | G06F 17/242 | 710/72 |
| 2005/0053283 A1* | 3/2005 | Wakeam | G06K 9/00402 | 382/186 |
| 2005/0091578 A1* | 4/2005 | Madan | G06F 17/241 | 715/201 |
| 2005/0152600 A1* | 7/2005 | Chen | G06K 9/222 | 382/187 |
| 2006/0147117 A1* | 7/2006 | Wakeam | G06K 9/00402 | 382/186 |
| 2006/0218171 A1* | 9/2006 | Wakeam | G06K 9/00409 | |
| 2006/0242424 A1* | 10/2006 | Kitchens | G06F 21/316 | 713/183 |
| 2007/0124700 A1* | 5/2007 | Koivisto | G06F 9/451 | 715/837 |
| 2007/0180397 A1* | 8/2007 | Hoyer | G06F 3/04886 | 715/780 |
| 2007/0200713 A1* | 8/2007 | Weber | H04L 67/24 | 340/573.1 |
| 2008/0089660 A1* | 4/2008 | Hashimoto | H04N 9/8042 | 386/336 |
| 2008/0109751 A1* | 5/2008 | Fitzmaurice | G06F 3/0488 | 715/793 |
| 2008/0189775 A1* | 8/2008 | Fujita | G06F 21/34 | 726/7 |
| 2008/0231635 A1* | 9/2008 | Saund | G06K 9/00416 | 345/440 |
| 2008/0232690 A1* | 9/2008 | Saund | G06F 3/04883 | 382/187 |
| 2008/0235211 A1* | 9/2008 | Saund | G06F 16/24578 | |
| 2009/0089453 A1* | 4/2009 | Bohan | G06F 3/14 | 709/246 |
| 2010/0049832 A1* | 2/2010 | Peleg | H04N 21/64322 | 709/219 |
| 2010/0210332 A1* | 8/2010 | Imai | A63F 13/10 | 463/7 |
| 2011/0154192 A1* | 6/2011 | Yang | G06F 17/2288 | 715/256 |
| 2011/0191211 A1* | 8/2011 | Lin | G06Q 30/0643 | 705/27.2 |
| 2011/0242119 A1* | 10/2011 | Bolz | G06T 15/005 | 345/522 |
| 2011/0302522 A1* | 12/2011 | Cao | G06F 16/532 | 715/780 |
| 2012/0036429 A1* | 2/2012 | Ajima | G06Q 30/02 | 715/259 |
| 2012/0065944 A1* | 3/2012 | Nielsen | G06Q 10/103 | 703/1 |
| 2012/0216216 A1* | 8/2012 | Lopez Taboada | G06F 9/544 | 719/314 |
| 2012/0254773 A1* | 10/2012 | Viswanathan | G06F 3/0483 | 715/753 |
| 2012/0258435 A1* | 10/2012 | Tee | G09B 7/02 | 434/336 |
| 2013/0011066 A1* | 1/2013 | Balassanian | G06K 9/00422 | 382/189 |
| 2013/0205202 A1* | 8/2013 | Xiao | G06F 17/218 | 715/249 |
| 2013/0314363 A1* | 11/2013 | Zhen | G06F 3/018 | 345/173 |
| 2013/0339459 A1* | 12/2013 | Kumashio | H04L 51/00 | 709/206 |
| 2014/0002384 A1* | 1/2014 | Li | G06F 3/03 | 345/173 |
| 2014/0018053 A1* | 1/2014 | Cho | G06F 3/0488 | 455/418 |
| 2014/0075302 A1* | 3/2014 | Akashi | G06K 9/222 | 715/268 |
| 2014/0098024 A1* | 4/2014 | Paek | G06F 3/04886 | 345/168 |
| 2014/0164984 A1* | 6/2014 | Farouki | G06F 3/0481 | 715/784 |
| 2014/0184531 A1* | 7/2014 | Demiya | G06F 3/04883 | 345/173 |
| 2014/0229318 A1* | 8/2014 | Natarajan | G06F 17/241 | 705/26.5 |
| 2014/0247271 A1* | 9/2014 | Fernandez | G06T 11/206 | 345/589 |
| 2014/0258260 A1* | 9/2014 | Rayborn | G06F 16/951 | 707/707 |
| 2014/0297437 A1* | 10/2014 | Natarajan | G06Q 30/0635 | 705/21 |
| 2014/0333987 A1* | 11/2014 | Keam | G02F 1/167 | 359/296 |
| 2014/0365918 A1* | 12/2014 | Caldwell | G06F 3/0481 | 715/753 |
| 2015/0138122 A1* | 5/2015 | Cho | G09G 3/3406 | 345/173 |
| 2015/0156147 A1* | 6/2015 | Liu | G06F 16/958 | 715/753 |
| 2015/0160729 A1* | 6/2015 | Nakagawa | G06F 3/016 | 345/173 |

(56) References Cited

U.S. PATENT DOCUMENTS

| | | | |
|---|---|---|---|
| 2015/0179134 A1* | 6/2015 | Kuo | G09G 5/02 345/589 |
| 2015/0215450 A1* | 7/2015 | Seo | H04L 67/22 455/566 |
| 2015/0271218 A1* | 9/2015 | Steingrimsson | G06Q 10/101 709/204 |
| 2015/0302242 A1* | 10/2015 | Lee | G06K 9/00442 382/189 |
| 2015/0370473 A1* | 12/2015 | Chen | G06F 3/04886 345/174 |
| 2016/0092112 A1* | 3/2016 | Akgun | G06F 9/44 711/154 |
| 2016/0117140 A1* | 4/2016 | Ikeda | G06F 3/1454 715/753 |
| 2016/0154769 A1* | 6/2016 | Ikeda | G06Q 10/101 715/268 |
| 2016/0180161 A1* | 6/2016 | Novak | G06T 11/60 382/189 |
| 2016/0198397 A1* | 7/2016 | Lee | H04W 48/16 455/434 |
| 2016/0275920 A1* | 9/2016 | Apodaca | G09G 5/39 |
| 2016/0292500 A1* | 10/2016 | Angelov | G06F 3/041 |
| 2016/0321029 A1* | 11/2016 | Zhang | G06F 3/165 |
| 2016/0321238 A1* | 11/2016 | Kurita | G06F 17/276 |
| 2016/0329031 A1* | 11/2016 | Yang | G06F 3/0485 |
| 2016/0350056 A1* | 12/2016 | Makar | G06F 3/1454 |
| 2017/0010773 A1* | 1/2017 | Curcelli | G06F 3/0483 |
| 2017/0060821 A1* | 3/2017 | Rucine | G06F 17/212 |
| 2017/0060829 A1* | 3/2017 | Bhatt | G06F 40/134 |
| 2017/0063942 A1* | 3/2017 | Yamaguchi | H04L 65/4015 |
| 2017/0068854 A1* | 3/2017 | Markiewicz | G06K 9/00416 |
| 2017/0087460 A1* | 3/2017 | Perry | A63F 13/35 |
| 2017/0169002 A1* | 6/2017 | Motoi | G06F 3/04883 |
| 2017/0220554 A1* | 8/2017 | Carter | G06F 40/284 |
| 2017/0228368 A1* | 8/2017 | Carter | G06F 40/284 |
| 2017/0285933 A1* | 10/2017 | Oh | G06F 3/04817 |
| 2017/0336960 A1* | 11/2017 | Chaudhri | G06F 3/04817 |
| 2017/0351912 A1* | 12/2017 | Harada | G06F 3/04883 |
| 2017/0358114 A1* | 12/2017 | Tennant | G06T 11/60 |
| 2018/0068194 A1* | 3/2018 | Matsuda | G10L 15/22 |
| 2018/0165255 A1* | 6/2018 | Gafford | G06F 17/241 |
| 2018/0188938 A1* | 7/2018 | Deselaers | G06F 3/04883 |
| 2018/0247550 A1* | 8/2018 | Lu | G09B 5/10 |
| 2018/0293906 A1* | 10/2018 | Chen | H04N 5/76 |
| 2018/0329743 A1* | 11/2018 | Pope | G06F 11/14 |
| 2018/0331976 A1* | 11/2018 | Pope | G06F 9/544 |
| 2018/0335932 A1* | 11/2018 | Ta | G06F 3/04845 |
| 2018/0336173 A1* | 11/2018 | Mikutel | G06F 17/242 |
| 2018/0348990 A1* | 12/2018 | Thimbleby | G06F 3/04817 |
| 2019/0036855 A1* | 1/2019 | Liu | G06F 3/04842 |
| 2019/0318148 A1* | 10/2019 | Hong | G06K 9/00181 |

\* cited by examiner

PROVIDING A GRAPHICAL CANVAS FOR HANDWRITTEN INPUT

CROSS-REFERENCE TO RELATED APPLICATIONS

The present application claims the benefit of U.S. Provisional Patent Application Ser. No. 62/514,773, entitled "PROVIDING A GRAPHICAL CANVAS FOR HANDWRITTEN INPUT," filed Jun. 2, 2017, which is hereby incorporated herein by reference in its entirety and made part of the present U.S. Utility Patent Application for all purposes.

TECHNICAL FIELD

The present description relates generally to processing input from an input device such as an electronic stylus or pen/pencil, and/or touch inputs and presenting such input in a graphical interface.

BACKGROUND

Interaction with electronic devices can be performed using various input devices, such as touch screen displays, touch-sensitive surfaces, remote controls, mice and other input devices. Touch-sensitive surfaces and touch screen displays, in particular, have become increasingly popular input devices, as has providing handwritten input using such input devices. Providing a graphical interface for presenting handwritten input has unique challenges.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Handwritten content in an electronic device can be received as input from touch inputs and/or from an electronic stylus or pen/pencil. Existing approaches to rendering handwritten input may also restrict the amount of handwritten input based on the size of a display of a given electronic device, limiting the amount of handwritten input to the dimensions of such a display. In the subject handwritten input rendering system, a graphical canvas may be provided to enable low latency rendering of handwritten input, which may then be copied over to other graphical content upon cessation of the handwritten input. In particular, implementations of the subject technology can render a scene and/or text, perform zooming in response to detecting an appropriate gesture, perform tiling of the current scene at the zoom setting, and switch to the graphical canvas for writing in a lower latency mode. Additionally, the graphical canvas provides for long (e.g., continuous) handwritten input to be rendered within the graphical canvas, which may be subsequently copied over to the current scene once the handwritten input ceases.

Figure 1:
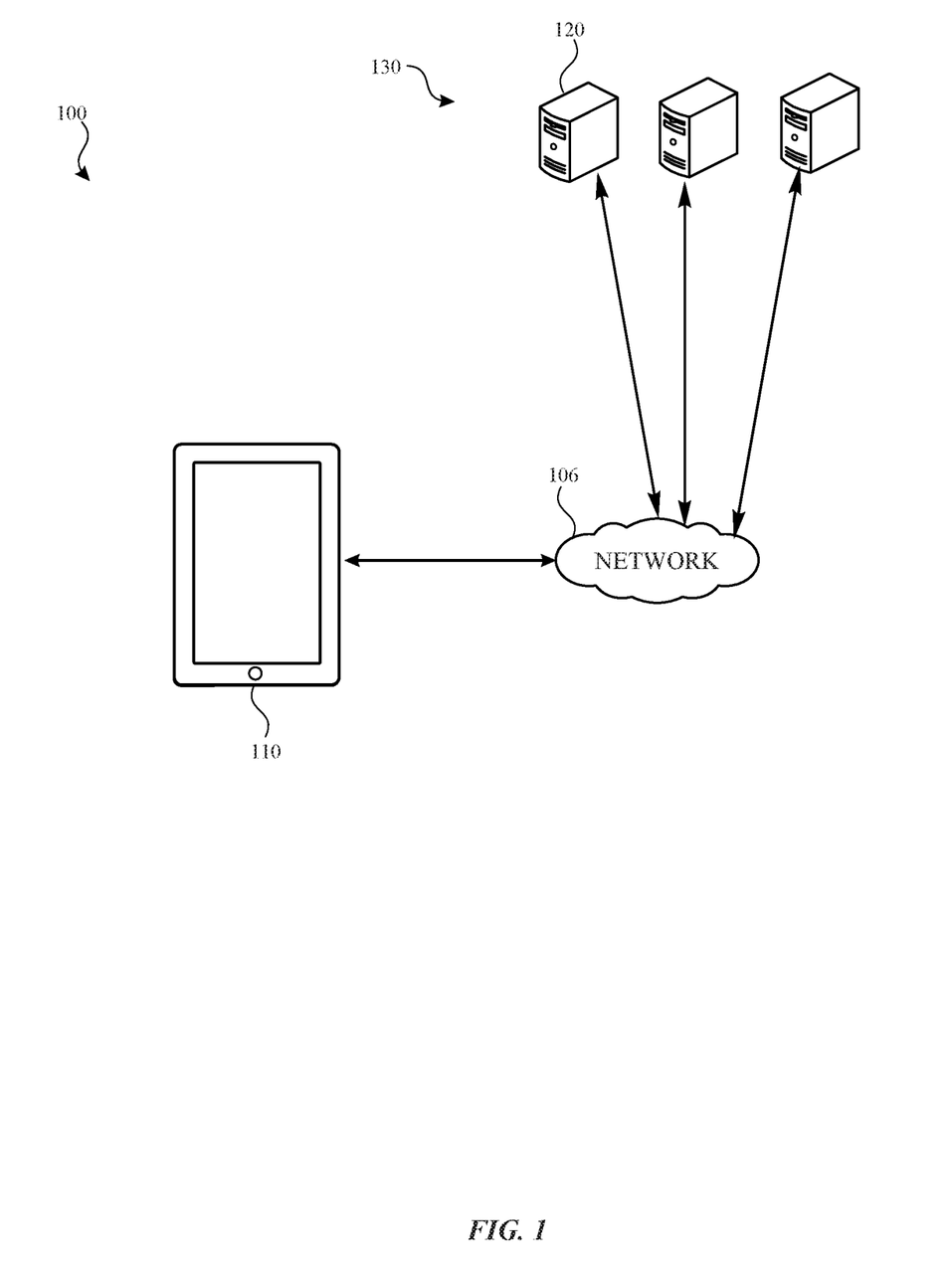
FIG. 1 illustrates an example network environment including an electronic device that may implement the subject system for providing a graphical canvas for handwritten input in accordance with one or more implementations.

FIG. 1 illustrates an example network environment 100 including an electronic device 110 that may implement the subject system for handwritten input rendering in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110 and a server 120 that may be included in a group of servers 130. The network 106 may communicatively (directly or indirectly) couple, for example, the electronic device 110 with the server 120 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic device discussed below with respect to the electronic system discussed below with respect to FIG. 6.

The electronic device 110 may include one or more contact intensity sensors. A contact intensity sensor may include one or more piezoresistive strain gauges, capacitive force sensors, electric force sensors, piezoelectric force sensors, optical force sensors, capacitive touch-sensitive surfaces, or other intensity sensors (e.g., sensors used to measure the force and/or pressure of a contact on a touch-sensitive surface). In an example, a contact intensity sensor can receive contact intensity information (e.g., pressure information or a proxy for pressure information) from the environment. Further, the electronic device 110 can also include at least one contact intensity sensor that is collocated with, or proximate to, a touch-sensitive surface. The electronic device 110, in one example, may also include at least one contact intensity sensor that is located on the back of the electronic device 110, opposite the touchscreen which may be located on the front of electronic device 110.

An intensity of a contact on a touch-sensitive surface (e.g., touchscreen, touchpad, etc.) can refer to a force or a pressure (force per unit area) of a contact (e.g., a finger contact or a stylus contact) on the touch-sensitive surface. Intensity of a contact can be determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Thus, it is appreciated that the contact intensity sensors provided by the electronic device 110 can measure a respective force measurement and/or a respective pressure measurement of a given contact on the touch-sensitive surface.

The electronic device 110 may implement the subject system to render handwriting input in a graphical canvas and be configured to receive handwritten input via different input methods including touch input, or from an electronic stylus or pen/pencil. The electronic device 110 may implement the example software architecture for rendering handwritten input that is discussed further below with respect to FIG. 2. Example graphical interfaces showing rendering of handwritten input are discussed in FIGS. 3A-3E. Examples of handwritten input rendering operations are discussed further below with respect to FIGS. 4 and 5.

The server 120 may be part of a network of computers or the group of servers 130, such as in a cloud computing or data center implementation. The server 120 and/or the group of servers 130 may store data, such as handwritten content, photos, music, text, web pages and/or content provided therein, etc., that may be accessible on the electronic device 110. Furthermore, handwritten content generated on the electronic device 110 may be stored on the server 120 and/or the group of servers 130.

Figure 2:
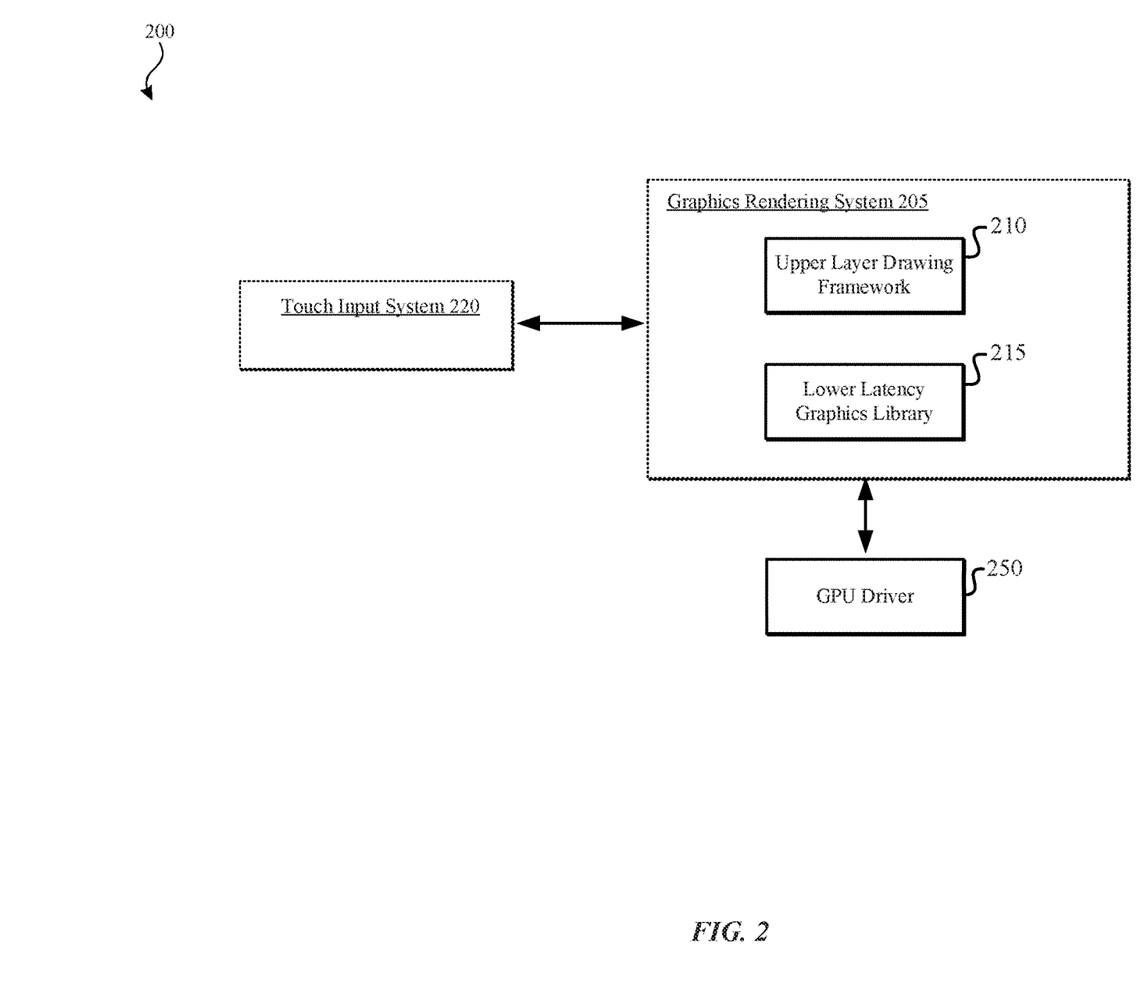
FIG. 2 illustrates an example software architecture that provides a graphical canvas for handwritten input in accordance with one or more implementations.

FIG. 2 illustrates an example software architecture 200 that provides a graphical canvas for handwritten input in accordance with one or more implementations. For explanatory purposes, the software architecture 200 is described as being provided by the electronic device 110 of FIG. 1, such as by a processor and/or memory of the electronic device 110, however, the software architecture 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 2, the software architecture 200 includes a touch input system 220 and a graphics rendering system 205. The graphics rendering system 205 includes an upper layer drawing framework 210, and a lower latency graphics library 215. The lower latency graphics library 215 can be part of an OpenGL® graphics library and/or can call an OpenGL® library. As referred to herein, OpenGL® (e.g., "Open Graphics Library") is a software library for rendering 2D and/or 3D graphics. OpenGL® may be used to interact with a graphics processing unit (GPU), to achieve hardware-accelerated and lower latency rendering of graphics. In the example software architecture 200, the lower latency graphics library 215 renders graphics with lower latency (e.g., a time period that it takes to render graphical content) when compared to the upper layer drawing framework 210, thus producing a more pleasing and immediate experience for a user. In an example, the upper layer drawing framework 210 may be utilized for rendering user interfaces including animating elements of such user interfaces. The upper layer drawing framework 210, in an implementation, may be a Core Animation® graphics framework.

The upper layer drawing framework 210 and the lower latency graphics library 215 can communicate with a GPU driver 250 to provide requests for rendering graphical content (e.g., handwritten input, etc.) onto a display of the electronic device 110. The GPU driver 250, in turn, communicates with a graphics processing unit (GPU) of the electronic device 110 to provide instructions for rendering the graphical content (e.g., based on the requests of the upper layer drawing framework 210 and/or the lower latency graphics library 215).

The touch input system 220 receives input strokes corresponding to handwritten input from a user. In one or more implementations, the touch input system 220 determines for a given input stroke the time, location, direction, stroke pressure, and/or stroke force for the input stroke. Stroke pressure as mentioned herein can refer to a measurement of pressure (e.g., force per unit area) of a contact (e.g., a finger contact or a stylus contact) corresponding to a stroke input on a given touch-sensitive surface (e.g., touchscreen, touchpad, etc.). In an example, the touch input system 220 samples multiple points within a stroke, takes a timestamp for each point sampled in each stroke. Each point within the stroke may include additional data such as location/proximity, stroke pressure, and/or stroke force. In an example, an input stroke can refer to stroke data received starting at stylus down (or an initial touch input) to stylus up (or a touch release), and, for each input stroke, a set of points that are part of each stroke are sampled. The touch input system 220 sends input strokes to the graphics rendering system 205, which may be further processed by the upper layer drawing framework 210 and/or the lower latency graphics library to render the input strokes. Examples of rendering graphics in connection with providing a graphical canvas for displaying handwritten input is described in FIGS. 3A-3E below.

FIGS. 3A-3E illustrate example graphical user interfaces (GUIs) that provide a graphical canvas for handwritten input in accordance with one or more implementations. FIGS. 3A-3E will be described by reference to portions of the software architecture 200, particular with respect to the touch input system 220 and the graphics rendering system 205 (and components therein).

Figure 3A:
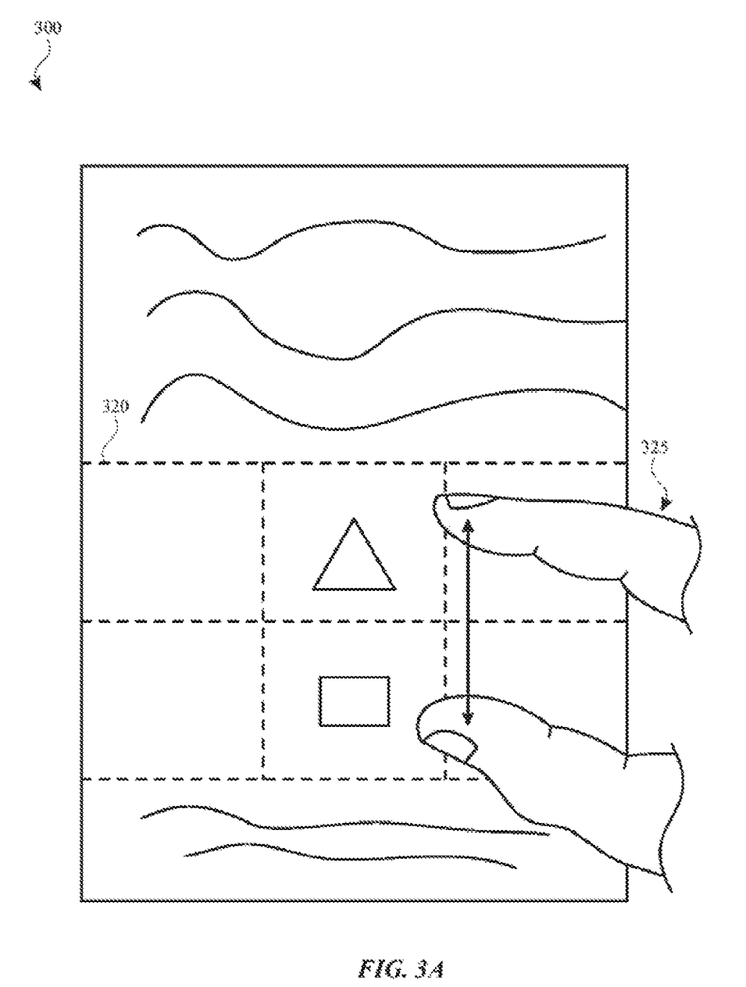
FIGS. 3A-3E illustrate example graphical user interfaces (GUIs) that provide a graphical canvas for handwritten input in accordance with one or more implementations.

FIG. 3A illustrates an example GUI 300 in which an image corresponding to a current view of a scene is displayed. The scene in FIG. 3A may include text, graphical images, handwritten content, etc. The GUI 300 may be rendered by the upper layer drawing framework 210 in this example, which results in a higher latency rendering of the scene. As shown, the image may be displayed in a set of tiles 320 (shown using dashed lines in FIG. 3A for purposes of explanation only) where each tile represents a respective portion of image data from the image. The image may be and/or may include handwritten content. Each tile may have specific width and height dimensions such as 256×256 pixels (although any appropriate set of dimensions may be used), and in an implementation, each tile is the same size in pixels (e.g., same width and height). Further, in one or more implementations, a given tile can be adjusted in size from a range of 256 pixels to 512 pixels. The upper layer drawing framework 210 may render each tile from the set of tiles 320 for displaying the image on the display of the electronic device 110. By utilizing the set of tiles 320, memory usage when rendering image data with handwritten content may be lowered in comparison to rendering an entirety of a document that includes the handwritten content.

As further shown in FIG. 3A, a gesture 325 may be received by the touch input system 220. In this example, the gesture 325 corresponds to a multi-touch pinch out to zoom gesture which instructs the upper layer drawing framework 210 to zoom in the image in accordance with the gesture.

Figure 3B:
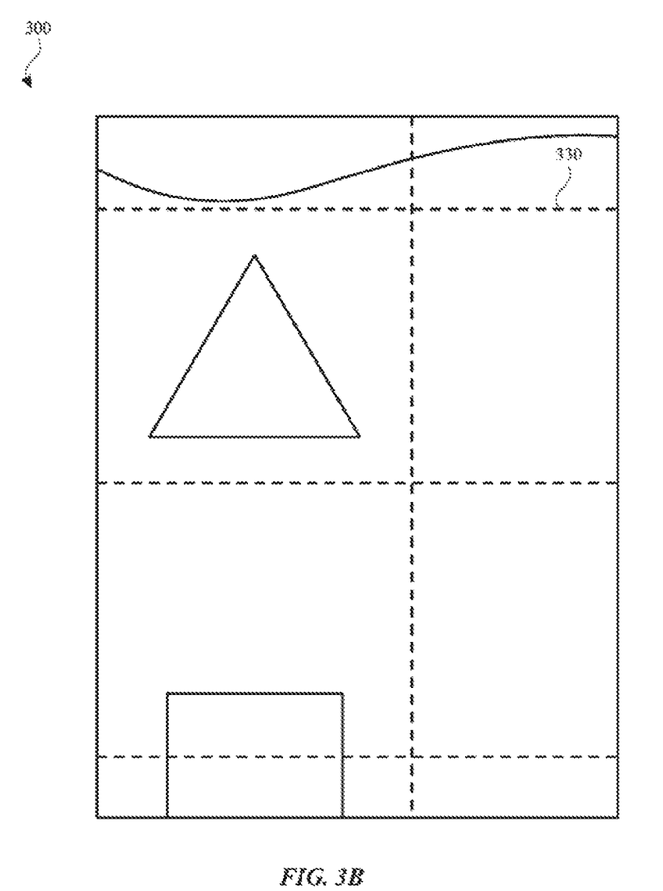

FIG. 3B illustrates the GUI 300 corresponding to a zoomed in view of the scene from FIG. 3A. The upper layer drawing framework 210 renders a new image corresponding to a zoomed in scene. A new image may include a new set of tiles 330 (which are shown in dashed lines for explanatory purposes only), which have been adjusted in sized in response to the new zoom setting. In this example, tile size may be based on a logarithmic scale (e.g., based on some multiplier value with the previous tile size) and, in an example, tile size can be adjusted from a range of 256 to 512 pixels. The new set of tiles 330 may be cached in memory to improve performance and/or reduce rendering time for future operations.

Upon receiving touch input (e.g., from an electronic stylus or pen/pencil) that indicates received input stroke data, image data from the tiles are copied over into a memory space corresponding to the lower latency graphics library 215 for lower latency rendering. This memory space stores graphics data, including the copied over image data, for being rendered to a graphical canvas.

The lower latency graphics library 215 displays a graphics context, which is transparent, on the screen of the electronic device 110 in response to the received touch input. The copied over image data from the tiles are then rendered by the lower latency graphics library 215 for display within this transparent graphics context. As used herein, a graphics context (or context) refers to a destination for drawing graphics and may be referred to as a graphical canvas herein.

Figure 3C:
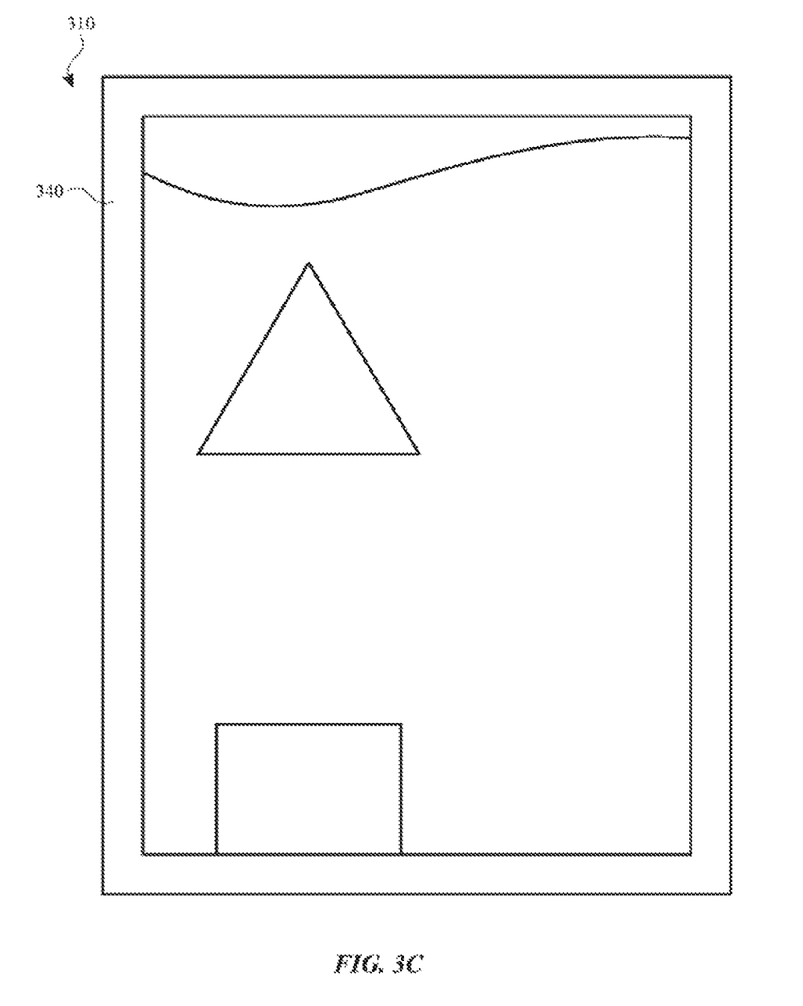

FIG. 3C illustrates a GUI 310 that includes a graphical canvas 340 in accordance with one or more implementations of the subject technology. The graphical canvas 340 includes a semi-transparent border as shown in the example of FIG. 3C. However, it is appreciated that the semi-transparent border is not needed to be displayed with the graphical canvas. The graphical canvas 340 provides for display the image data from the tiles 330 in FIG. 3B that were copied over into the memory space of the lower latency graphics library 215. In an implementation, the graphical canvas 340 may be rendered over the view of the tiles 330 shown in FIG. 3B (e.g., overlaid). The semi-transparent border can function as an extra buffer that captures input stroke data (e.g., corresponding to a thick stroke) that may go outside of the area of the graphical canvas 340. In this manner, the input stroke data captured within the semi-transparent border can also be copied over back into the tiles, and, as result, prevent a potential loss of this input stroke data.

Figure 3D:
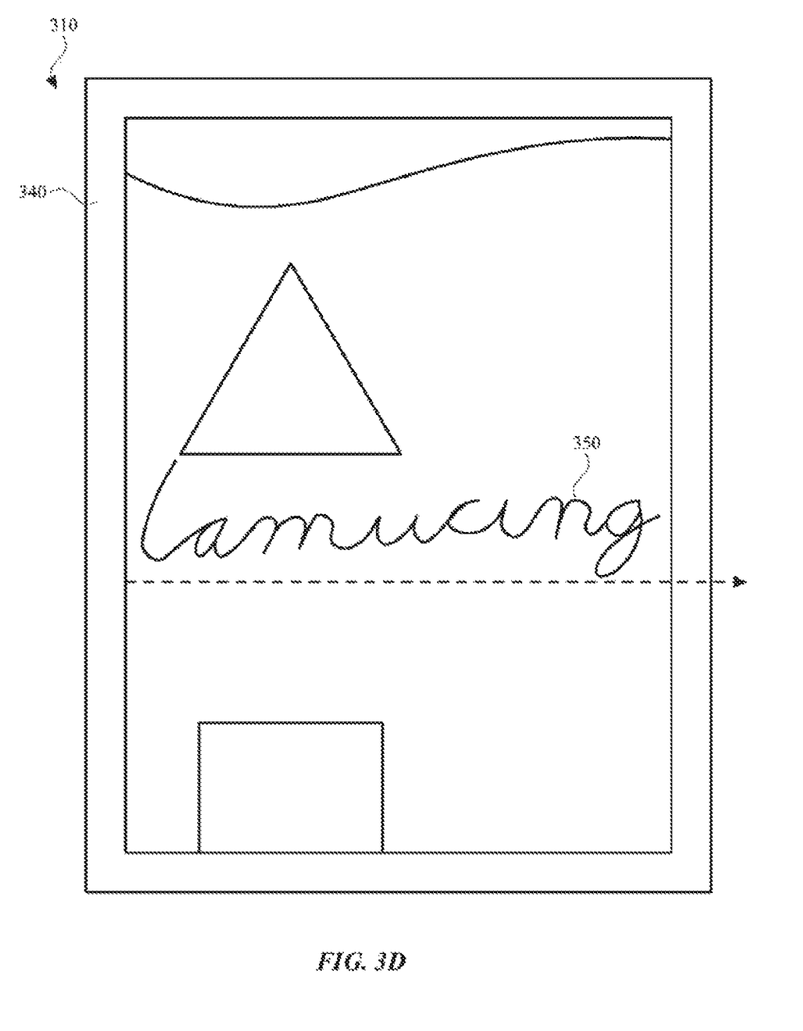

FIG. 3D illustrates the GUI 310 in which graphical canvas 340 displays rendered handwritten input 350 in accordance with one or more implementations of the subject technology. The graphical canvas 340 enables the handwritten input 350, as received by the touch input system 220 in a left to right writing direction as a continuous touch input (e.g., as indicated by the dotted arrow), to be rendered in a lower latency mode. By utilizing the lower latency graphics library 215, graphics that are displayed inside the graphical canvas 340 advantageously render in the lower latency mode that results in the handwritten input 350 being displayed on the screen of the electronic device 110 in a faster manner. The handwritten input 350 is stored as graphics data in the memory space of the lower latency graphics library 215 in an implementation.

FIG. 3D also shows that the handwritten input 350 has ceased approximately near the right edge of the graphical canvas 340. Upon detecting that the handwritten input 350 has ended by the touch input system 220, the graphics rendering system 205 can copy the graphics data from the memory space of the lower latency graphics library 215 over to tiles (e.g., stored in the cache) provided by the upper layer drawing framework 210. These tiles include image data corresponding to the scene displayed in FIG. 3B when the initial touch input was received (e.g., the tiles 330), and the image data is merged (e.g., through a compositing technique) with the graphics data corresponding to the rendered handwritten input from the graphical canvas 340 in an implementation.

Figure 3E:
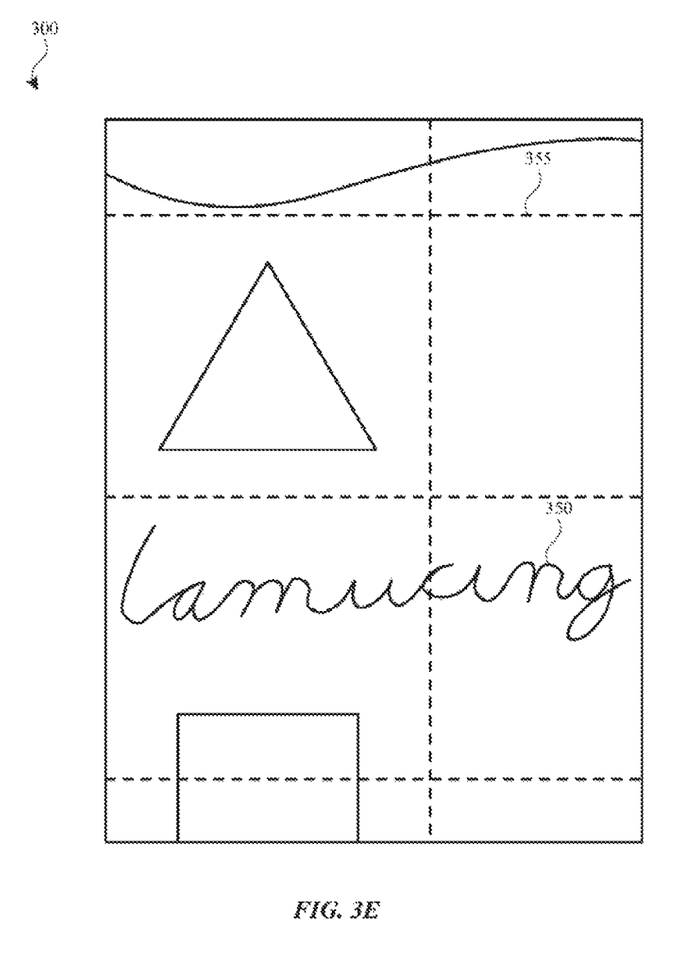

FIG. 3E illustrates the GUI 300 (e.g., rendered by the upper layer drawing framework 210) with tiles 355 displaying a scene with an image with image data corresponding to the handwritten input 350 that was copied over from the graphical canvas 340 in FIG. 3D.

Figure 4:
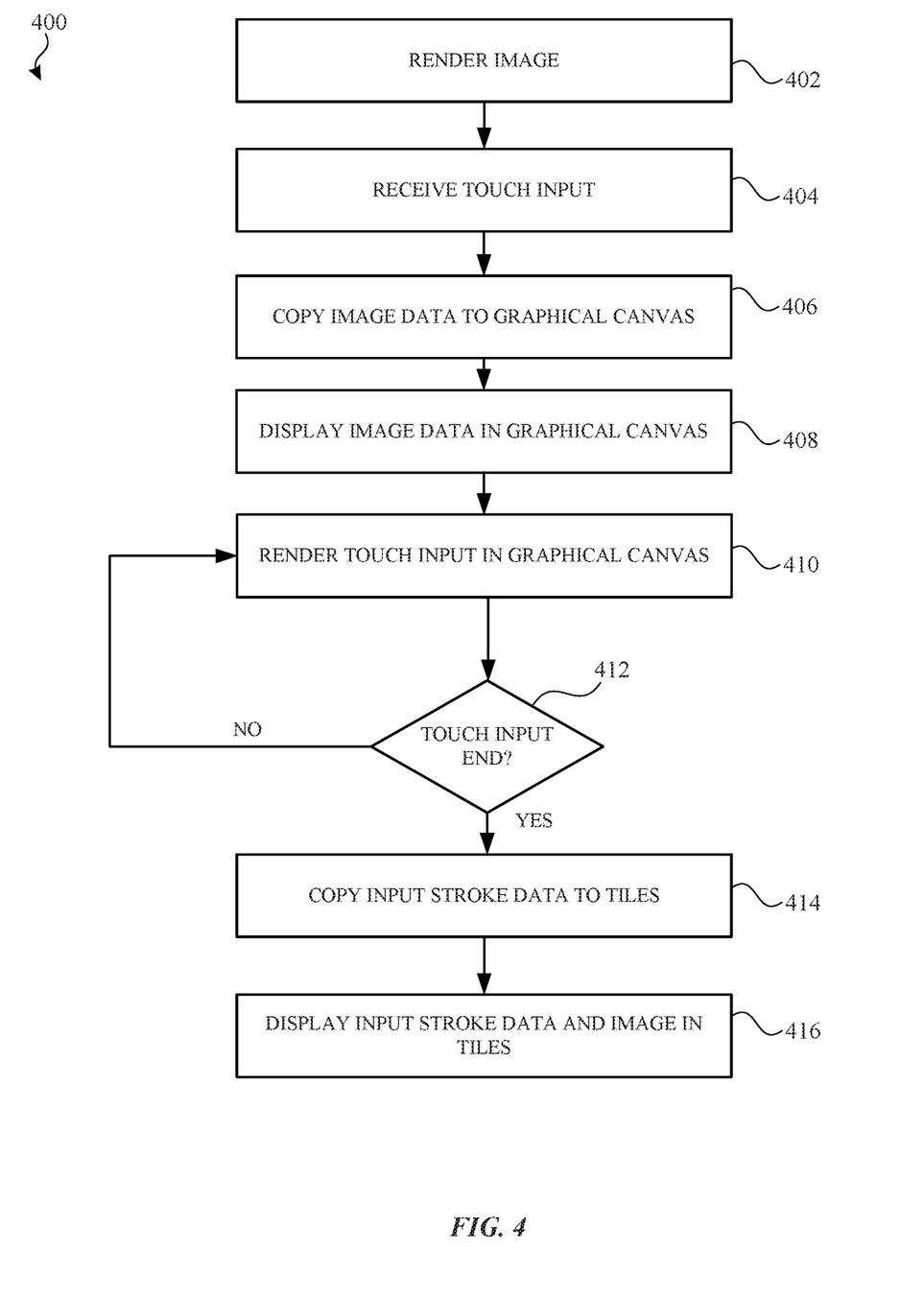
FIG. 4 illustrates a flow diagram of an example process for providing a graphical canvas for handwritten input in accordance with one or more implementations.

FIG. 4 illustrates a flow diagram of an example process 400 for providing a graphical canvas for handwritten input in accordance with one or more implementations. For explanatory purposes, the process 400 is primarily described herein with reference to components of the software architecture of FIG. 2, which may be executed by the electronic device 110 of FIG. 1. However, the process 400 is not limited to the electronic device 110, and one or more blocks (or operations) of the process 400 may be performed by one or more other components of other suitable devices and/or software applications. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The upper layer drawing framework 210 renders an image corresponding to image data of a current scene (402) in a first view. The image may include graphical data and/or textual data and/or handwritten content. The touch input system 220 receives a touch input corresponding to input stroke data for handwritten input (404) on the rendered image. In response to the touch input, the graphics rendering system 205 copies (406) the image data from the tiles into a memory space of the lower latency graphics library 215 in order to render the image data in a graphical canvas. The graphics rendering system 205, using the lower latency graphics library 215, provides for display the image data in the graphical canvas in a second view. In an implementation, the graphical canvas is overlaid over at least a portion of the rendered image (408). The graphics rendering system 205, using the lower latency graphics library 215, renders the received input stroke data in the graphical canvas where the input stroke data is continuous with the (initial) touch input (410).

If the touch input is determined to have ended (412) (e.g., based on a touch release event), the graphics rendering system 205 copies graphics data including the input stroke data from the memory space of the lower latency graphics library 215 to memory of the upper layer drawing framework 210 corresponding to tiles of the current scene (414). The upper layer drawing framework 210, using a compositing algorithm, merges the copied over graphics data with the image data of the tiles. The upper layer drawing framework 210 then provides for display (416) the merged input stroke data and tiles in the first view.

In some instances, an initial area corresponding to the set of tiles provided in the first view (e.g., rendered by the upper layer drawing framework 210) can be scrolled past the initial area based on received touch input (e.g., when the user is viewing other parts of a document with handwritten content). In these instances, the tiles from the first view (e.g., provided by the upper layer drawing framework 210) can be flushed out of memory in order to load new tiles corresponding to the new area based on the scroll movement. In other instances, tiles may be flushed out of memory after a particular memory threshold is reached in order to improve system performance and/or memory utilization. An example process of implementing this type of tile management is described in FIG. 5 below.

Figure 5:
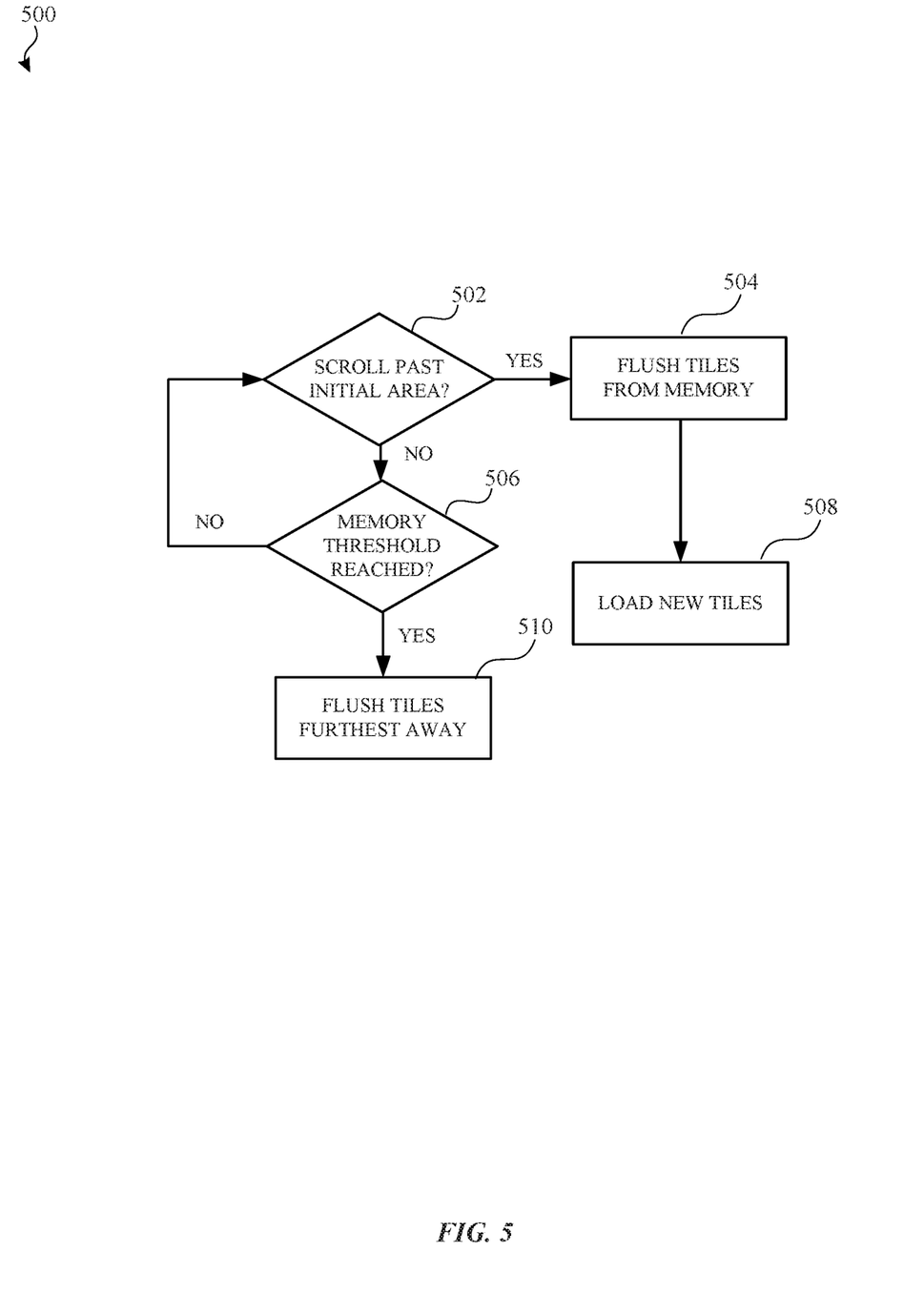
FIG. 5 illustrates a flow diagram of an example process for managing tiles that are stored in memory in accordance with one or more implementations.

FIG. 5 illustrates a flow diagram of an example process 500 for managing tiles in memory in accordance with one or more implementations. For explanatory purposes, the process 500 is primarily described herein with reference to components of the software architecture of FIG. 2, which may be executed by the electronic device 110 of FIG. 1. However, the process 500 is not limited to the electronic device 110, and one or more blocks (or operations) of the process 500 may be performed by one or more other components of other suitable devices and/or software applications. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The graphics rendering system 205, based on received touch input from the touch input system 220, detects that scrolling past an initial area of a set of tile has occurred (502). The set of tiles may be rendered by the upper layer drawing framework 210. The graphics rendering system 205 then flushes tiles out of memory (504) and loads new tiles into memory (508) in which the new tiles correspond to the new area based on the scrolling. Alternatively, scrolling past the initial area of the graphical canvas has not occurred (502), but a memory threshold has been reached (506), the graphics rendering system 205 flushes tiles according to distance from a current view, and flushes the tiles that are furthest away in distance from the current view (510). In an example, this distance can be determined based on a distance of each tile from a centroid the current view (e.g., the center of the area including the current set of tiles in memory). In yet another example, the graphics rendering system 205 can assign a value to each tile based on a metric associated with the complexity of rendering a given tile. In this example, tiles that require greater complexity (e.g., computing resources) in order to be rendered are favored over other, less complex, tiles such that the other tiles would be flushed out of memory before the more complex tiles.

Figure 6:
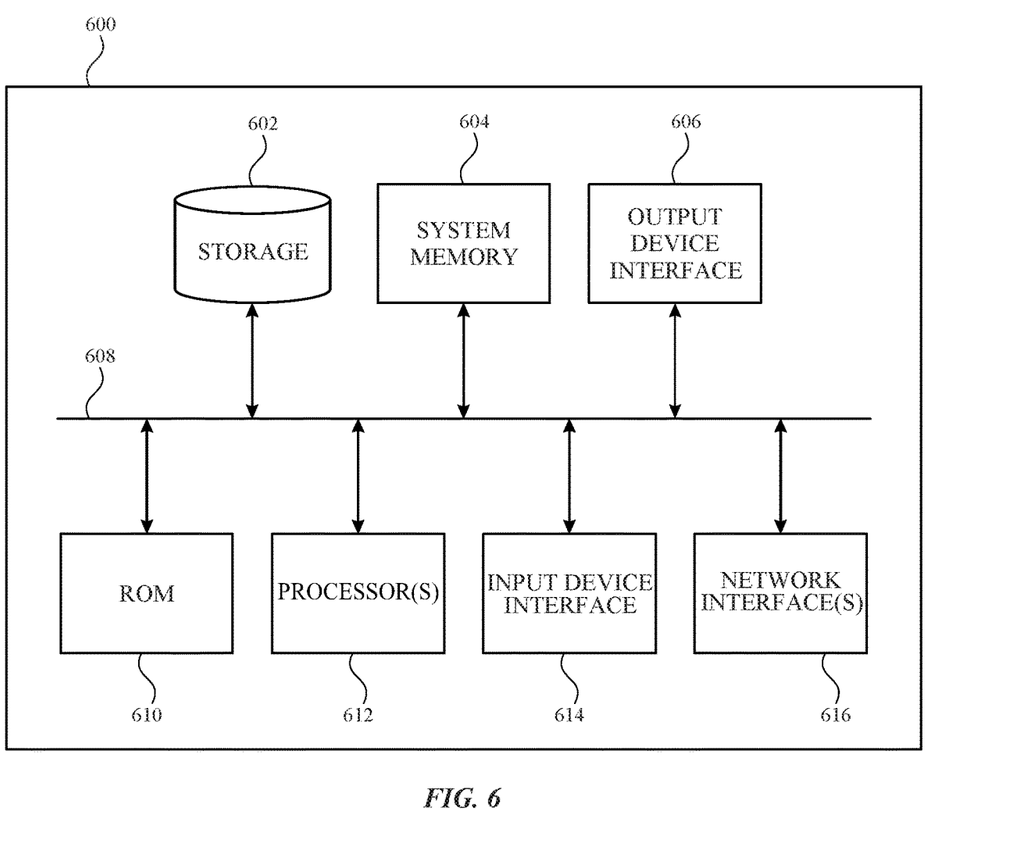
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of, the electronic device 110, and/or the server 120 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 62 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

rendering an image divided into a plurality of tiles in a first view, each tile comprising image data corresponding to a portion of the image;

responsive to detecting an initiation of a touch input corresponding to the image, copying the image data from the plurality of tiles to a graphical canvas;

displaying the image data in the graphical canvas in a second view, the graphical canvas being overlaid over a portion of the rendered image, wherein the image data displayed in the graphical canvas in the second view is a copy of at least a portion of the rendered image concurrently displayed in the first view;

receiving input stroke data corresponding to the second view, the input stroke data being continuous with the touch input;

responsive to detecting that the touch input has ended, copying the input stroke data to the plurality of tiles of the first view; and displaying the input stroke data and the image in the plurality of tiles of the first view, wherein the rendered image is rendered using an upper layer drawing framework, and the displayed image data in the graphical canvas in the second view is rendered using a lower latency graphics library.

2. The method of claim 1, wherein the plurality of tiles are stored in a cache associated with the upper layer drawing framework.

3. The method of claim 1, wherein displaying the image data in the graphical canvas in the second view is performed using a graphics library that has a lower latency for rendering the image data than the upper layer drawing framework.

4. The method of claim 3, wherein copying the image data from the plurality of tiles to the graphical canvas comprises copying the image data to a memory space associated with the lower latency graphics library.

5. The method of claim 1, wherein the graphical canvas comprises a transparent layer over the first view including the plurality of tiles.

6. The method of claim 1, further comprising:

receiving a second touch input comprising a gesture for zooming out the first view; and rendering a second image in the first view, the image comprising a second plurality of tiles based on a new zoom setting.

7. The method of claim 6, wherein the second plurality of tiles are adjusted in size with respect to the plurality of tiles and the new zoom setting.

8. The method of claim 1, further comprising:

flushing the plurality of tiles from a memory; and loading a second plurality of tiles into the memory.

9. The method of claim 8, wherein flushing the plurality of tiles from the memory is based on a distance of scrolling or a memory threshold of storing the plurality of tiles in the memory.

10. The method of claim 1, wherein the copy of the at least the portion of the rendered image that is displayed in the graphical canvas in the second view is displayed concurrently with the displayed at least the portion of the rendered image in the first view.

11. A system comprising:
a processor;
a memory device containing instructions, which when executed by the processor cause the processor to:
  render an image divided into a plurality of tiles in a first view, each tile comprising image data corresponding to a portion of the image;
  responsive to detecting an initiation of a touch input in the first view, copy the image data from the plurality of tiles to a graphical canvas;
  display the image data in the graphical canvas in a second view, the graphical canvas being overlaid over at least a portion of the rendered image;
  receive input stroke data in the second view, the input stroke data received in the second view being continuous with the touch input received in the first view;
  responsive to detecting that the touch input has ended, copy the input stroke data to the plurality of tiles of the first view; and
  display the input stroke data and the image in the plurality of tiles of the first view,
  wherein the rendered image is rendered using an upper layer drawing framework, and the displayed image data in the graphical canvas in the second view is rendered using a lower latency graphics library.

12. The system of claim 11, wherein the memory device contains further instructions, which when executed by the processor further cause the processor to:
  receive a second touch input comprising a gesture for zooming out the first view; and
  render a second image in the first view, the image comprising a second plurality of tiles based on a new zoom setting.

13. The system of claim 11, wherein the memory device contains further instructions, which when executed by the processor further cause the processor to:
  flush the plurality of tiles from a memory; and
  load a second plurality of tiles into the memory.

14. The system of claim 13, wherein to flush the plurality of tiles from the memory is based on a distance of scrolling or a memory threshold of storing the plurality of tiles in the memory.

15. The system of claim 11, wherein the plurality of tiles are stored in a cache associated with the upper layer drawing framework.

16. The system of claim 15, wherein displaying the image data in the graphical canvas in the second view is performed using a graphics library that has a lower latency for rendering the image data than the upper layer drawing framework.

17. The system of claim 16, wherein copying the image data from the plurality of tiles to the graphical canvas comprises copying the image data to a memory space associated with the lower latency graphics library.

18. The system of claim 11, wherein the graphical canvas comprises a transparent layer over the first view including the plurality of tiles.

19. The system of claim 11, wherein the copied image data displayed in the graphical canvas is a copy of at least a portion of the rendered image in the first view.

20. The system of claim 11, wherein the input stroke data received in the second view that is continuous with the touch input received in the first view is received without a touch release event between the touch input and the input stroke data.

21. A non-transitory computer-readable medium comprising instructions, which when executed by a computing device, cause the computing device to perform operations comprising:
  rendering an image divided into a plurality of tiles in a first view, each tile comprising image data corresponding to a portion of the image;
  responsive to detecting an initiation of a touch input corresponding to the image, copying the image data from the plurality of tiles to a graphical canvas;
  rendering the image data in the graphical canvas in a second view concurrently with rendering the image in the first view, the graphical canvas being overlaid over at least a portion of the rendered image, the rendering of the image data in the graphical canvas having a lower latency than the rendering of the image in the first view;
  receiving input stroke data corresponding to the second view, the input stroke data being continuous with the touch input;
  responsive to detecting that the touch input has ended, copying the input stroke data to the plurality of tiles of the first view; and
displaying the input stroke data and the image in the plurality of tiles of the first view,
  wherein the rendered image is rendered using an upper layer drawing framework, and the rendered image data in the graphical canvas in the second view is rendered using a lower latency graphics library.

* * * * *